Oct. 18, 1949.　　　　A. FRUM　　　　2,485,582
RECEIVER SYSTEM
Filed June 11, 1945
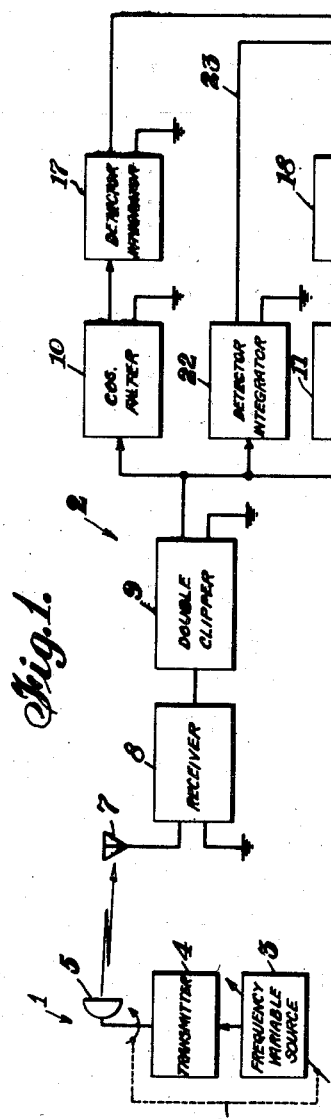
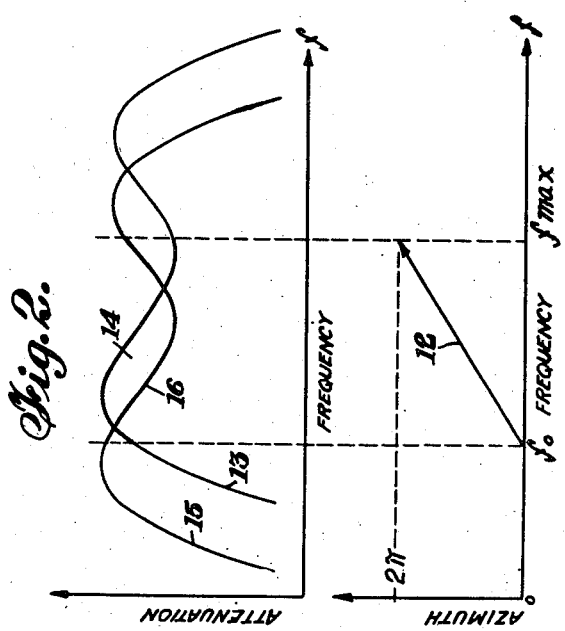
INVENTOR.
ALEXANDER FRUM
BY Patented Oct. 25, 1949

2,485,582

UNITED STATES PATENT OFFICE 2,485,582

RECEIVER SYSTEM

Alexander Frum, New York, N. Y., assignor to Federal Telephone and Radio Corporation, New York, N. Y., a corporation of Delaware Application June 11, 1945, Serial No. 598,707

7 Claims. (Cl. 343—113)

1

This invention relates to a frequency selective azimuth indicator and more particularly to a frequency selective receiver for use with an omnidirectional beacon.

Systems have been proposed wherein at a beacon station there are transmitted signals in the form of a sharply directive beam having characteristics that vary in accordance with sine and cosine functions proportional to the rotary angle of the beam. These signals may then be received at a receiver point and compared in amplitude in order to obtain the azimuth position of the receiver with respect to the rotatable beacon.

In general, such systems have been proposed in several forms. One form provides a variation in pulse spacing producing harmonics which are related as sine and cosine functions as set forth in the copending application of E. Labin and D. D. Grieg, Serial No. 532,724, filed April 26, 1944, now Patent No. 2,450,005.

A second form of beacon of this general type is provided in which signals of different frequencies are transmitted, these signals varying as sine and cosine functions of the rotation angle for a single rotation of a rotatable beacon. At a receiving point the signals are received and separated and applied to a comparison indicator so that by a comparison of the amplitude of these signals the correct azimuthal position with respect to the beacon may be ascertained. Such a system is set forth in the copending application of E. Labin and D. D. Grieg, Serial No. 581,974, filed March 10, 1945.

In accordance with my invention, a receiver is provided for use with an omnidirectional beacon in which a signal varying in frequency with variation in azimuthal position is transmitted in a sharply directive beam. At a receiving point, the variant frequency energy is received and is passed through two selective circuits, one in which the attenuation of the variable frequency signal will vary in accordance with a cosine function throughout the rotation frequencies of the beam and the other in which the attenuation will vary as a sine function throughout this frequency. These separately attenuated signals are then compared in a ratiometer to determine the azimuthal position of the receiver with respect to the radio beacon. In order to provide a 360° indication, the received variable frequency signal may be detected and subtracted from the separately derived attenuated envelopes so that as applied to the ratiometer the signal varies equally above and below zero amplitude level.

2

It is an object of this invention to provide a frequency indicating system wherein the frequencies within a given range are passed over selective circuits variable respectively in accordance with predetermined different functions and in which these separated signals are applied to a comparison device to provide a measurement of the frequency of the energy within said range.

It is a further object of my invention to provide a receiver for a radio beacon, wherein the frequency of signals from the beacon is varied over a predetermined range in accordance with the angular position of the beacon, which will produce a direct indication of the azimuth angle of the receiver equipment with respect to the beacon.

It is a still further object of my invention to provide a radio beacon receiver equipment operable to indicate the azimuth position in response to a variable frequency wave, the frequency of which depends upon the pointing direction of the beacon wherein the received signal energy is applied over separate frequency discriminating circuits having attenuation characteristics varying as sine and cosine functions respectively and detector or rectifier circuits to an indicator to provide an indication of azimuth direction.

It is a still further object of my invention to provide a receiver responsive to a wave of variable frequency in which the wave is passed over two different attenuating circuits which will produce a predetermined amplitude relationship in the output thereof dependent upon the frequency applied thereto and comparing these output signals to derive an indication of the frequency received and hence the azimuth angle of the beacon receiver.

A better understanding of my invention and the objects and features thereof may be had from the particular description of an embodiment thereof made with reference to the accompanying drawings in which:

Fig. 1 is a block schematic diagram of a beacon system in accordance with my invention; and Fig. 2 is a set of curves used in explaining the operation of the circuits shown in Fig. 1.

In Fig. 1, a radio beacon 1 is shown which transmits signals for producing azimuthal indication in a receiver such as generally shown in block diagram 2. The transmitter may comprise a frequency variable source 3 coupled through a transmitter 4 to a rotatable antenna 5. Antenna 5 and frequency variable source 3 are simultaneously controlled as indicated by dotted line 6 so that the frequency of the signals transmitted will vary for each different direction of transmission of the beam from antenna 5. The signal transmitted may consist of a frequency-varied modulated tone or may consist directly of a frequency variation of the radiated carrier wave. It will thus be clear that from the beacon the frequency will depend upon the particular direction in which the beam is pointing. As a consequence any receiver equipment which will be able to receive and identify the frequency will be able to follow a direct beacon course to the radio transmitter.

To provide a direct indication of the azimuth of such a beam, I provide a receiver equipment such as shown at 2. The received energy from antenna 5 is picked up by receiving antenna 7 and applied to the receiver 8. If the transmitted signals are a frequency variable modulated wave, receiver 8 should include a detector for deriving this frequency variable wave. However, if the signals consist merely of a frequency modulation of the carrier wave, receiver 8 may be simply an amplifier circuit. Preferably the received energy is gate clipped in a double clipper arrangement 9 to reduce the variable frequency signal to a constant output amplitude. Although the clipping arrangement may introduce certain harmonics, these harmonics will generally be of sufficiently high frequency as not to affect the indications to any appreciable extent. It should be clear, however, that if clipping is undesirable the amplitude level may be controlled by volume control apparatus in receiver 8.

The output energy from clipper 9 is applied in parallel to filters 10 and 11 the characteristics of which will be described with reference to Fig. 2. Filter 10 has a response varying in attenuation over the frequency range of the radio beacon in accordance with a function of cosine of $\theta$ where $\theta$ is the angle of direction of the antenna 5 represented by the particular frequency received. Thus the response in the output may be proportional to $1+m \cos (f-f_0)$ where $f_0$ represents the frequency for a particular reference direction of antenna 5, for example north, and $f$ the frequency received at 7. Filter 11 has an attenuation characteristic varying as a sine function of the angle $\theta$ and may be expressed as $1+m \sin (f-f_0)$. In both these expressions $m$ has a value of less than unity so that the output amplitude remains of one sign throughout the frequency range covered by the azimuth signal. For known filters which may be designed to assume the above characteristics, reference may be had to the circuit and characteristics shown and described on pages 154 and 155 of the Radio Engineers' Handbook by Terman (1st edition, 1943; McGraw Hill Book Co.).

Turning to Fig. 2 the frequency variations of the variable source 3 for a single rotation may be represented by line 12 varying from a value of $f_0$ to a value $f$ max during the rotation of the antenna from 0 to $2\pi$. The cosin and sine filters 10 and 11 of Fig. 1 may be readily designed to have the proper characteristics throughout this frequency swing. As shown in Fig. 2, 13 may represent the cosine filter characteristic in which the heavy line portion 14 represents the cosine function wave over the frequency range passed by filter 10. Curve 15 may represent the sine filter arrangement wherein the sine function portion in the output of filter 11 is represented by the heavy line portion 16. The design of sine and cosine filter to obtain the desired characteristics 14 and 16 over the particular frequency range may be readily carried out in accordance with the principles of known filter design. These filters should be constant in operation and should be capable of reproduction so that they will be uniform for all the receivers. When higher frequencies are used quartz crystals may be used as filter elements to assure stability of operation.

The outputs from filters 10 and 11 may be applied over detecting and integrating circuits 17, 18 respectively and over combining circuits 19 and 20 respectively to an indicating meter 21 which may be a ratiometer. In order to provide for a 360° scale indication corresponding to the 360° in azimuth of the radio beacon it is necessary to subtract from the output curves 14 and 16 applied to combining circuits 19 and 20 a value sufficient to bring the zero line to the midpoint of these curves. This may be simply done by detecting and integrating the variable frequency waves directly as at 22. The output of this detector integrator may be applied directly over line 23 to both combining circuits 19 and 20 so that the energy will be substracted to produce the desired output wave. Integrating circuits are used in each instance at 17, 18 and 22 in order that the signal which is received for a brief period of time as the beam passes antenna 7 may be stored to provide a continuous indication.

The indicator circuit will be seen to comprise essentially a frequency measuring device permitting the use of a ratiometer with a 360° scale. For beacon purposes the variable frequency arrangement has many advantages. The readings will not be thrown off by variation in one or more of the transmitter circuits as would be the case in amplitude comparison of separate signals. Further since only the frequency applied is important, many of the operations such as clipper 9 and the like may be readily used without detracting from the accuracy of the system. The signals as received may be heterodyned or frequency multiplied to produce a lower or a higher frequency for the purpose of comparison as desired. By the use of frequency multiplication a narrower frequency swing at the beacon may be provided thus improving signal-to-noise ratio. All of the distortion products produced by these various non-linear circuits are substantially eliminated in the filter and therefore will not detract from the accuracies of the system.

In the foregoing description I have outlined the principles of my invention with respect to a particular circuit arrangement. It should be distinctly understood, however, that this description is given only by way of illustration and is not to be considered as a limitation of the scope of my invention as set forth in the objects thereof and in the appended claims.

I claim:

1. An indicator for producing an angular displacement corresponding to the frequency of energy within a given frequency range, comprising means having a constant attenuation with frequency characteristic for said frequency varying in accordance with a predetermined law over said frequency range, a second means having a constant attenuation characteristic in accordance with a different predetermined law over said range, means for applying said energy to said first and second means, and indicator means responsive to the output of said first and second means for comparing the output from said combining circuits.

2. A receiver adapted to provide an indication of direction with respect to a radio beam having energy varying in frequency in accordance with the azimuth direction of the beam, comprising selective means having a constant attenuation characteristic with frequency in accordance with a cosine function, selective means having a constant attenuation in accordance with a sine function, means for applying the received energy to both said selective means, and means for comparing the outputs of the two selective means.

3. A receiver adapted to provide an indication of direction with respect to a rotatable radio beam having energy varying in frequency in accordance with the azimuth direction of the beam comprising limiting means for limiting the amplitude of received energy to a given value, selective means having a constant attenuation with frequency characteristic in accordance with a cosine function of the angle representing azimuth in the output of said limiting means, selective means having a constant attenuation with frequency characteristic in accordance with a sine function of the angle representing azimuth in the output of said limiting means, means for applying the received energy to said limiting means, and means for comparing the ratio of the outputs of the two selective means.

4. A receiver for producing an angular indication corresponding to a given frequency sweep of received energy within a given frequency band, comprising filter means having a constant attenuation with frequency characteristic for said band corresponding to a cosine function of said angle coupled to the output of said receiver, a second filter means having a constant attenuation with frequency characteristic for said band corresponding to a sine function of said angle coupled to the output of said receiver, means for detecting outputs of said filter means, means for detecting directly output energy from said receiver, combining circuits for combining the directly detected energy with the detected energy from said first and second filters and indicator means responsive to the outputs of said combining circuits for comparing said outputs.

5. A receiver for producing an angular indication corresponding to a given frequency sweep of a received signal within a given frequency band, clipper means for producing a signal wave of a given amplitude, filter means having a constant attenuation with frequency characteristic for said band corresponding to one plus the cosine of said angle coupled to the output of said clipper means, a second filter means having a constant attenuation with frequency characteristic for said band corresponding to one plus the sine of said angle coupled to the output of said clipper means, means for rectifying the outputs of said filter means, means for detecting directly output energy from said clipper, combining circuits for combining the directly detected energy with the rectified energy from said first and second filters and ratiometer indicator means responsive to the outputs of said combining circuits to produce an angular indication.

6. A receiver for producing an angular indication corresponding to the given angular sweep, of a received signal varied in frequency with said sweep within a given frequency band, comprising amplitude control means for producing a signal wave of a given amplitude in response to the received signal, a first means having a constant attenuation with frequency characteristic for said band corresponding to one plus a constant times the cosine of said angle, coupled to the output of said amplitude control means, a second means having a constant attenuation with frequency characteristic for said band corresponding to one plus a constant times the sine of said angle coupled to the output of said amplitude control means, means for detecting and integrating the outputs of said first and second means, means for detecting and integrating directly output energy from said amplitude control means, combining circuits for combining the directly detected and integrated energy with the integrated energy from said first and second means and ratiometer means responsive to the output of said combining circuits for comparing the output from said combining circuits.

7. A receiver for producing an azimuth indication in response to the frequency of a received signal within a given frequency band corresponding to different angular positions of a rotary beacon, comprising amplitude limiting means for limiting the received signal wave to a given amplitude, filter means having a constant attenuation with frequency characteristic for said band corresponding to one plus the cosine of the angle represented coupled to the output of said amplitude limiting means, a second filter means having a constant attenuation with frequency characteristic for said band corresponding to one plus the sine of said angle coupled to the output of said amplitude limiting means, means for rectifying and integrating the outputs of said filter means to provide voltages corresponding to the sine and cosine functions, means for detecting and integrating directly output energy from said clipper to provide a voltage corresponding to half the swing of said sine and cosine functions, combining means for subtracting the directly detected integrated energy from the rectified integrated energy from said first and second filters and ratiometer indicator means responsive to the output of said combining circuits for comparing the output voltages from said combining circuits.

ALEXANDER FRUM.

REFERENCES CITED

The following references are of record in the file of this patent:

UNITED STATES PATENTS

| Number | Name | Date |
| --- | --- | --- |
| 2,377,902 | Relson | June 12, 1945 |
| 2,402,410 | Kear | June 18, 1946 |